(No Model.)
A. S. HICKLEY.
APPARATUS FOR SUPPLYING LIQUIDS IN GAS GENERATORS.
No. 386,584. Patented July 24, 1888.
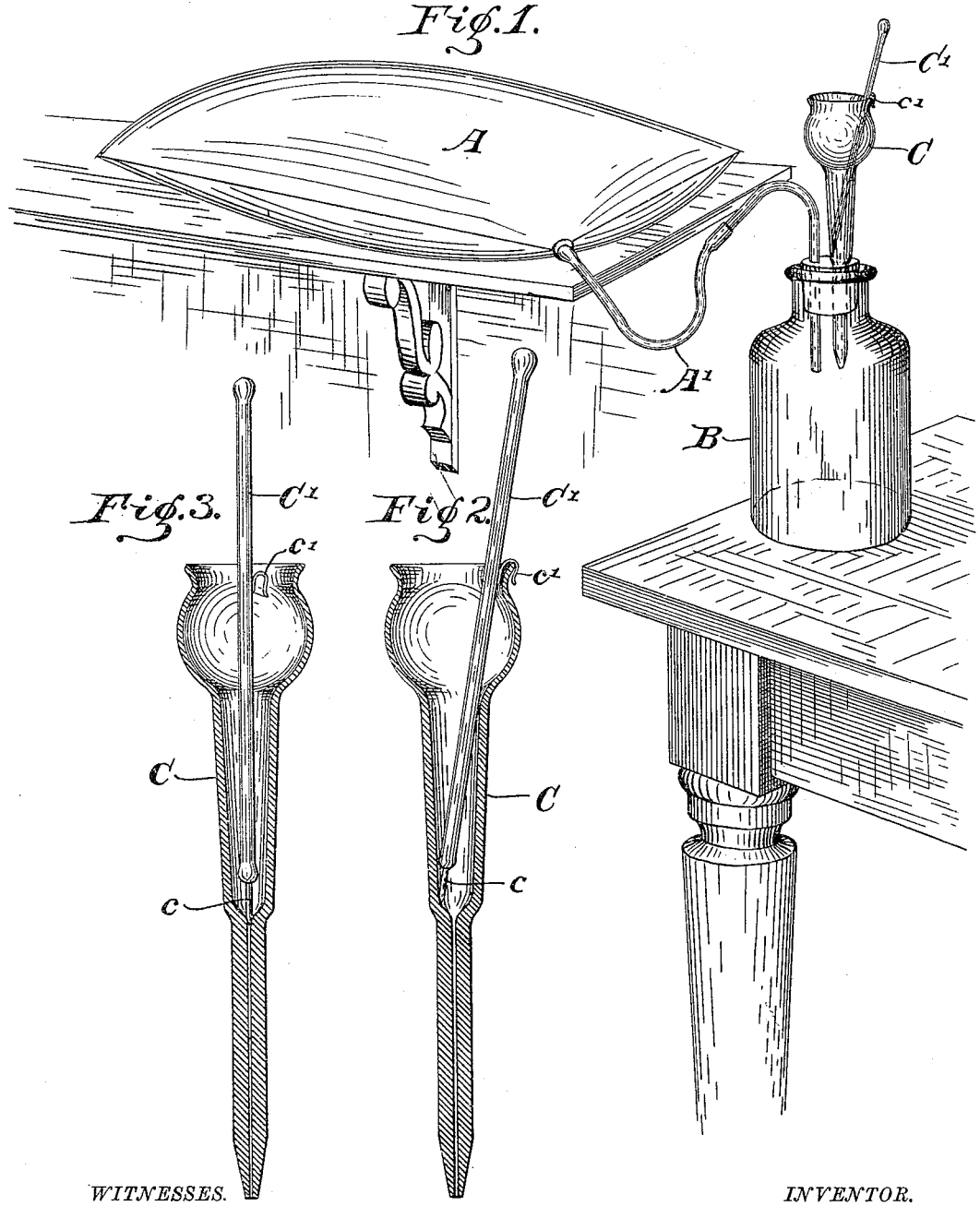
WITNESSES.
Chas. N. Leonard,
Charles L. Thurber.
INVENTOR.
Arthur S. Hickley,
PER
C. Bradford,
ATTORNEY.

UNITED STATES PATENT OFFICE.

ARTHUR S. HICKLEY, OF INDIANAPOLIS, INDIANA, ASSIGNOR TO THE JENNEY ELECTRIC COMPANY, OF SAME PLACE.

APPARATUS FOR SUPPLYING LIQUIDS IN GAS-GENERATORS.

SPECIFICATION forming part of Letters Patent No. 386,584, dated July 24, 1888.

Application filed May 25, 1887. Serial No. 239,309. (No model.)

*To all whom it may concern:*

Be it known that I, ARTHUR S. HICKLEY, of the city of Indianapolis, county of Marion, and State of Indiana, have invented certain new and useful Improvements in Automatic Drop-Vessels for Gas-Generating Apparatus, of which the following is a specification.

This invention relates to apparatus for producing carbonic-acid or other gas; and it consists, particularly, in the construction of the supply-vessel or tunnel by which the sulphuric or other acid is introduced into the bottle or other vessel containing the other ingredient, such as an aqua solution of carbonate of soda.

I have designed this invention particularly for use in producing the sulphureted hydrogen gas which is used in the treatment of consumption, and is produced by passing the carbonic-acid gas (produced by the ingredients above mentioned) through another solution; but it may of course be used in producing any sort of gas capable of being generated by this process.

It is essential that the acid which is used in the production of a gas by the aforementioned process shall not flow too fast, for if this is permitted the gas is generated too rapidly, and too great a pressure is thus occasioned, which is apt to blow the acid from the supply-vessel over the operator, and this, as is well known, is often serious in its results.

My device consists of a tunnel with a capillary tube at its lower end, through which the acid must pass very slowly—commonly at the rate of about one drop per second—which, coming in contact with the substance in the lower vessel, produces a steady, even flow of gas with but a moderate pressure, which easily escapes through the eduction-tube to the receiving vessel or reservoir, (usually a rubber bag,) and should any greater pressure than common result it will not, as when the opening is larger, blow the acid out of the tunnel or supply-vessel, but instead will simply check the flow, which of course will stop the generation of the gas until the pressure is relieved. When the operator desires to stop the generation of gas altogether, it can be done by means of a rod, which acts as a gate, as will be hereinafter more particularly described.

Referring to the accompanying drawings, which are made a part hereof, and on which similar letters of reference indicate similar parts, Figure 1 is a perspective view illustrating an apparatus (embodying my invention) for producing gas; Fig. 2, a central vertical section of the tunnel or supply-vessel separately, to which my invention particularly relates; and Fig. 3, a similar view with the opening closed by means of the rod or gate.

In said drawings, the portions marked A represent the gas-receiver; B, the lower vessel of the generator, and C the upper vessel or tunnel of the generator, which is the subject of my present invention. This process and apparatus is, generally speaking, a common one. The receiver A is commonly a rubber bag, which is connected by a pipe or tube, A', with the interior of the vessel B, which is commonly a bottle of suitable size, and the tube A' usually passes through the stopper of said bottle, as shown in the drawings.

The tunnel or supply-vessel is in general form similar to an ordinary glass tunnel; but its lower end is extended and its interior terminates in a capillary tube running through this extension, which, as shown, itself in the construction illustrated passes through the stopper of the bottle. This supply-vessel or tunnel is preferably of glass, although any non-corrosible metal would answer the purpose.

It may of course be any preferred size or form, that which I have illustrated being simply shown as a convenient or desirable form. It should be provided with a rod, C', which should also be of glass or non-corrosible metal, but perhaps is best as I have shown it—a glass rod with a platinum or other non-corrosible wire point, c, and a small hook, c', of similar metal attached to one side. The lower end or point, whatever the material, should be pointed, so as to fit the upper end of the capillary tube and stop the flow when desired, and the hook on the side should be so arranged, as shown, as to hook over the upper edge of the tunnel or vessel C and hold the point c away from the orifice at the bottom of said vessel when the latter is in use.

Having thus fully described my said invention, what I claim as new, and desire to secure by Letters Patent, is—

1. The combination, with the receiver and generator of a gas-generating apparatus, of a supply-vessel for the acid, terminating in a minute orifice and provided with a rod terminating in a point, by which said orifice may be closed when desired, substantially as set forth.

2. The combination, with the supply-vessel of a gas-generating apparatus, terminating in a small eduction tube or orifice, of a rod for closing said orifice upon occasion, provided with a hook by which it can be held up away from said orifice without being removed from the supply-vessel altogether, substantially as set forth.

In witness whereof I have hereunto set my hand and seal, at Indianapolis, Indiana, this 20th day of May, A. D. 1887.

ARTHUR S. HICKLEY. [L. S.]

In presence of—
C. BRADFORD,
CHARLES L. THURBER.